Figure 1:
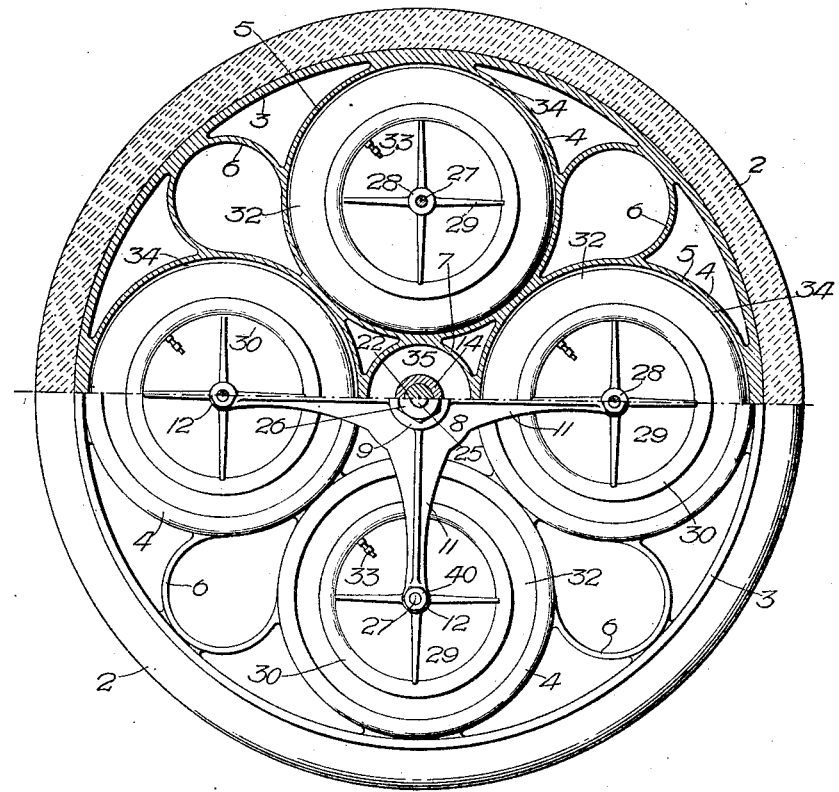

R. T. PARK.
RESILIENT WHEEL.
APPLICATION FILED JUNE 17, 1914.

1,113,244.

Patented Oct. 13, 1914.
2 SHEETS—SHEET 1.

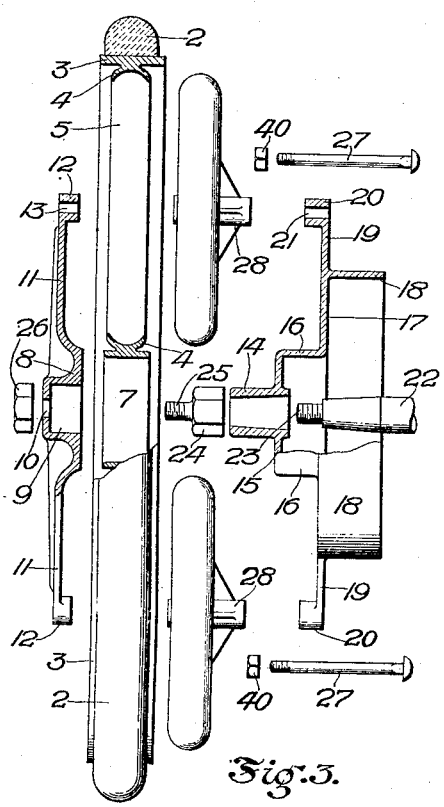
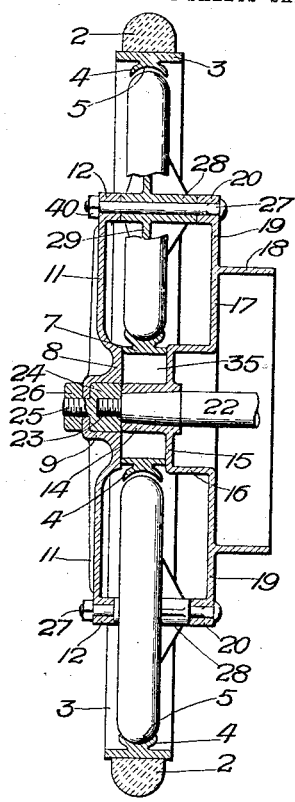
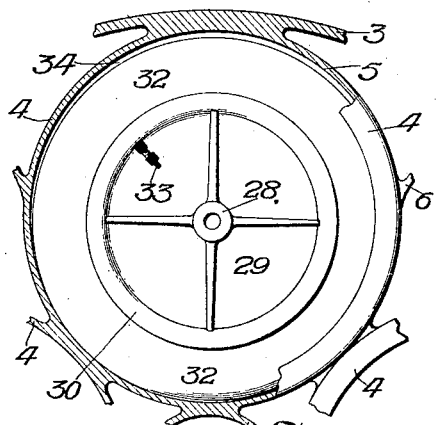
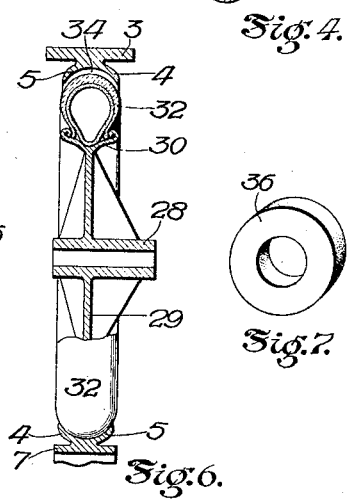

UNITED STATES PATENT OFFICE.

RICHARD THOMAS PARK, OF SOUTH MELBOURNE, VICTORIA, AUSTRALIA, ASSIGNOR TO R. T. P. PATENT WHEELS PROPRIETARY LIMITED, OF MELBOURNE, AUSTRALIA, A CORPORATION OF VICTORIA, AUSTRALIA.

RESILIENT WHEEL.

1,113,244.  Specification of Letters Patent.  Patented Oct. 13, 1914.

Application filed June 17, 1914. Serial No. 845,719.

*To all whom it may concern:*

Be it known that I, RICHARD THOMAS PARK, a subject of the King of Great Britain and Ireland, and a resident of the city of South Melbourne, a suburb of the city of Melbourne, in the county of Bourke, State of Victoria, Commonwealth of Australia, (whose post-office address is 137 York street, in the said city of South Melbourne,) have invented a certain new and useful Improved Resilient Wheel, of which the following is a specification.

This invention relates to resilient wheels of the kind wherein a series of circular frames form the spokes of the wheels, which circular frames have around their exterior pneumatic cushions. In the construction of wheels of this type several attempts have been made to provide resiliency between the axle or hub and the outer rim of the wheel which has been encompassed by tires of various types, either solid, tubular or pneumatic. The objections to such wheels have been many, principal among which have been (a) the liability of rupture of the pneumatic cushions in consequence of the drag between them and the interior surface of the rim of the wheel, or between the cushions and the means attached to the rim of the wheel securely retaining the pneumatic cushions thereto. This has been caused by reason of the fact that the designers have aimed at forming as compact and as rigid a structure as possible between the pneumatic cushions around the circular frames and the rim of the wheel to which they have been securely retained. The circular frames have also been rigidly secured. (b) Wear and tear of the circular frames and particularly the pneumatic cushions around the same due to the strain on the latter when the vehicle has been started, also when road shocks are encountered and transmitted from the rim of the wheel to the said cushions and frames. The action in such cases has caused a drag between the said rim to which the pneumatic cushions have been rigidly secured and the circular frames which have been rigidly fastened to the bolts holding them, the said pneumatic cushions being in turn rigidly secured to the said circular frames. The strains required to be taken by the pneumatic cushions have been very severe and tend to diminish their life and usefulness. (c) Use of side plates which have been heavy and cumbersome and made access to the wheel difficult besides increasing the cost of construction and maintenance. (d) Failure to secure perfect resiliency owing to the manner in which the pneumatic circular cushions have been used. If these cushions have been sufficiently inflated to secure the desired rigidity necessary to retain the cushions in their correct position between the circular frames and the rim of the wheel, resiliency has been lost. If inflated to a lesser degree the wheel has lost its stability and the desired compact structure between the cushion and the rim of the wheel. This has heretofore been considered essential. (e) Unless all the series of cushions have been inflated to a regular degree the wheel has been irregular in its stability and liable to cause undue strain and ultimate collapse. (f) The tendency of the outer covers of the circular cushions to "creep" and drag the inner inflated tubes with them, notwithstanding the fact that the said tubes are retained to the circular frames, has had a detrimental effect upon the tubes and shortened their life and durability.

The object of the present invention is to provide a resilient wheel suitable for many purposes and particularly useful for motor driven vehicles such as motor cars, motor busses, and the like. It aims at the production of a resilient, light, practical wheel, which will overcome all the above objections and in addition provide a wheel, the construction of which is simple and compact and may be easily assembled and quickly dismantled by the ordinary attendant or user of a motor vehicle.

The pneumatic tires forming circular rotating cushions around the circular frames, which take the place of spokes, are designed to rotate instead of being rigidly secured as heretofore and the use of the inflated tubes within the pneumatic tires forming the circular rotating cushions is not entirely relied upon to insure solidity or stability of the wheel.

A novel feature of the invention consists in providing pneumatic rotating cushions of such a nature that the guides attached to the major rim of the road element are of greater diameter than the circular rotating pneumatic cushions resting therein. This causes a crescent shaped space to exist between the said cushions and the guides when the wheel is in use. This permits of free circumferential movement of the cushions in the guides while only a minimum amount of surface of the cushions is presented for wear and friction and this minimum amount of surface is continually changing. Provision is made whereby the interior of the wheel may be thrown open for inspection in a few moments by slackening one main axle nut and four or more smaller nuts dependent upon the number of circular rotating cushions used.

The wheel includes a minimum of parts, all of which are light, but durable. It is easy of access and may be readily inspected and adjusted or dismantled and reërected in a minimum of time.

Means are adopted whereby in case of accident to the pneumatic circular rotating cushions the vehicle is not dependent upon the said cushions for rigidity as the wheel may be converted into a resilient wheel of another nature by inserting around the axle and within the road element a flexible plug or ring as hereinafter described.

Other features of novelty consists in the construction and arrangement of the various parts as will be hereinafter more particularly discernible from the following description and from the drawings accompanying this specification.

Figure 2:
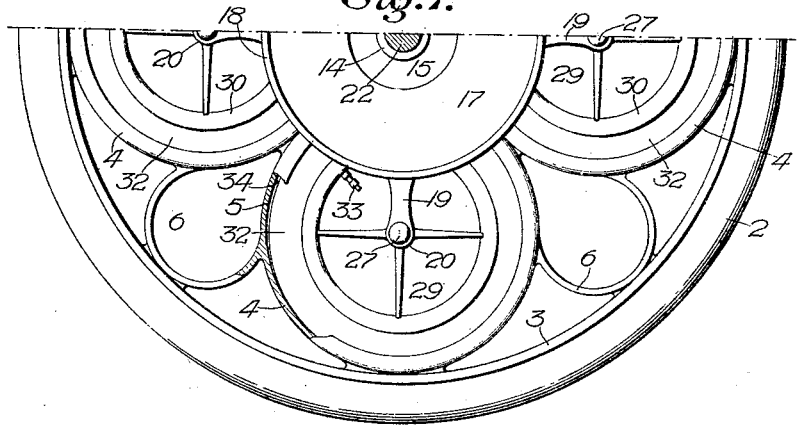

Referring to the drawings which form a part of this specification, Figure 1 is a side elevation of a wheel constructed in accordance with this invention showing the side of the wheel away from the vehicle. The upper half is shown in section. Fig. 2 is a side elevation, partly in section, of half a wheel showing the side of the wheel toward the vehicle. Fig. 3 is a view, partly in section, of the principal parts of the wheel in a disassembled condition. Fig. 4 shows the parts assembled and partly in section. Fig. 5 is an enlarged view, partly in section, of a minor wheel and its guide, showing clearly the crescent shaped space existing therebetween. Fig. 6 is a cross section of Fig. 5. Fig. 7 is a perspective view of a flexible centralizer.

This invention includes a road element which has a major tire 2 which is solid, pneumatic, or of any other character. The tire is secured to a rectangular sectioned major rim 3 in any well known way. Integral with the major rim or otherwise suitably mounted therein, are a series of guides 4. Each of these guides forms an annular pathway in which is a semi-circular sectioned bed 5. The edges of the guides at each side of these pathways are of such a nature that they retain the circular rotating cushions (hereinafter referred to) in position. Between the interior of the major rim and the exterior of the guides are integral reinforcing members 6. Between the exteriors of the guides and integral therewith is situated a hub ring 7. With the road element is used a hub element which includes inner and outer side frames and minor wheels and axles hereinafter described. Outside the road element is situated an outer side frame having a central or major boss 8. Inside this is a nut chamber 9 through the crown of which is a central hole 10. Arms 11 extend from the said major boss. At the extremity of each arm is an outer or minor boss 12 having therein minor axle holes 13.

On the side of the wheel toward the vehicle is situated a side plate which has a central or major boss 14 having a hole therethrough. Beyond the boss is a flange 15 beyond which is a cylindrical portion 16. Proceeding from the cylindrical portion is a disk portion 17 from which protrudes a brake band or drum 18. In some classes of wheels the brake drum is dispensed with. Extending from the boss are arms 19 at the extremities of which are outer or minor bosses 20 having minor axle holes 21 therein. Inside the hole in the major boss of the inner side frame is a major axle 22. The outer end 23 of this axle is threaded and upon it is situated an inner capped nut 24. The head 25 of this nut is extended and threaded. Upon this threaded head 25 is an outer nut 26.

Through the holes in the minor bosses of the arms extending from the inner side frame and the outer side frame are the minor axles 27 having minor nuts 40. Upon each axle turns a minor wheel having a hub 28. From this minor hub spokes 29 extend to a channeled rim 30. Upon each rim 30 are beads accommodating pneumatic or other tires 32 which form the circular rotating cushions. Inflating valves 33 are provided. Any form or type of pneumatic tire 32 may be used to form the circular rotating cushions.

The outside diameter of each minor wheel is less than the inside diameter of each of the semi-circular sectioned beds in the guides 4. A crescent shaped space indicated at 34 therefore exists (when the wheels are in use) between the periphery of each minor wheel and the pathway in which it is situated.

Between the hub ring 7 of the road element and the major boss 14 of the inner side frame is an annular space indicated at 35 which permits of the movement or play between the axle element and the road element. In cases of emergency, there may be inserted into this annular space an annular flexible centralizer 36. This is only used in the event of damage or derangement of the minor wheels. The insertion of the cencentralizer supports the wheel and gives it a certain amount of resiliency enabling the car to be driven safely to where desired.

The wheel according to this invention may be applied to the major axle as follows:— The inner side frame is passed over the axle and the major boss thereon fits upon the said axle. The inner nut is then tightened upon the major axle. Through the minor axle holes in the inner side frame are placed the minor axles. Upon each minor axle is placed a minor wheel. When each minor wheel is in position in its circular pathway each pneumatic tube may be inflated. The outer side frame is then placed in position and the outer nut threaded upon the head of the inner nut of the major axle. The nuts are also placed upon the minor axles. To separate the parts or to remove the major wheel from the axle it is only necessary to remove the outer nut of the major axle and the nuts of the minor axles, when the outer side frame, minor wheels and major wheel may be dismantled, the circular rotating cushions being first deflated to some extent. To place the flexible centralizer in position it is only necessary to remove the outer side frame as described.

Having now described my invention, what I claim as new and desire to secure by Letters Patent is:—

1. An improved resilient wheel comprising a hub and felly, a plurality of circular guide-ways mounted within the said hub and felly, a plurality of rotatable resilient members, a frame on each side of the said wheel providing means for supporting the said rotatable resilient members within the said guide-ways, one of the said frames having a central boss having an opening therein, a bolt fitting within the said boss and passing through the opening therein, a lock nut on the bolt on the outside of the said boss, the head of the bolt having a screw-threaded opening, the other frame having an outwardly extending portion within the hub and adjacent the head of the bolt, an axle having a screw-threaded portion passing through the said outwardly extending portion and screwed within the opening in the head of the bolt, the parts arranged as and for the purpose described.

2. An improved resilient wheel comprising a hub and felly, a plurality of circular guide-ways mounted within the said hub and felly, a plurality of rotatable resilient members, a frame on each side of the said wheel providing means for supporting the said rotatable resilient members within the said guideways, one of the said frames having a boss at its center, the other of the said frames having two outwardly stepped portions adjacent its center, the center-most stepped portions extending within the hub, and of a less diameter than the hub, the other stepped portion adjacent the outside of the hub of the wheel, an axle having bearings in the said frames, and a resilient member adapted to be placed in the space between the centermost stepped portion of the said frame and the hub of the wheel, the parts arranged as and for the purpose described.

3. An improved resilient wheel comprising a hub and felly, a plurality of circular guide-ways mounted within the said hub and felly, a plurality of rotatable resilient members, a frame on each side of the said wheel providing means for supporting the said rotatable resilient members within the said guide-ways, an axle, one of the said frames having outwardly extending portions at its center, one of the said portions extending within the hub of the wheel, and of a less diameter than the diameter of the hub, means between said frames and the axle to form a locking support for said axle, and a resilient member adapted to be placed in the space between the said hub portion and the hub, the parts arranged as and for the purpose described.

In testimony whereof I have hereunto affixed my signature in the presence of two subscribing witnesses.

RICHARD THOMAS PARK.

Witnesses:
CECIL M. PASTUER,
FRANK F. CAIN.

---

Copies of this patent may be obtained for five cents each, by addressing the "Commissioner of Patents, Washington, D. C."